United States Patent [19]
Ironside et al.

[11] Patent Number: 5,261,236
[45] Date of Patent: Nov. 16, 1993

[54] TURBOCHARGED ENGINE CONTROL SYSTEM

[75] Inventors: John M. Ironside, Birmingham; David K. Bryers, Woking; David A. R. Willcocks, Ipswich, all of England

[73] Assignee: Lucas Industries public limited company, Solihull, United Kingdom

[21] Appl. No.: 675,397

[22] Filed: Mar. 26, 1991

[30] Foreign Application Priority Data

Apr. 4, 1990 [GB] United Kingdom ............ 9007638
Apr. 17, 1990 [GB] United Kingdom ............ 9008564

[51] Int. Cl.$^5$ ............................................ F02B 37/00
[52] U.S. Cl. ............................................ 60/600; 123/399
[58] Field of Search ............ 60/600, 601, 602, 611; 123/564, 399

[56] References Cited

U.S. PATENT DOCUMENTS

| | | | |
|---|---|---|---|
| 4,471,741 | 9/1984 | Asik et al. | 123/399 |
| 4,646,522 | 3/1987 | Mamiya et al. | 60/611 X |
| 4,715,184 | 12/1987 | Oosawa et al. | 123/564 X |
| 4,741,163 | 5/1988 | Hidaka et al. | 60/603 X |
| 4,781,162 | 11/1988 | Ishikawa et al. | 123/399 |
| 4,848,086 | 7/1989 | Inoue et al. | 60/602 |

FOREIGN PATENT DOCUMENTS

| | | | |
|---|---|---|---|
| 0419808 | 4/1991 | European Pat. Off. | |
| 3303350 | 8/1984 | Fed. Rep. of Germany | 60/602 |
| 3727669 | 11/1988 | Fed. Rep. of Germany | |
| 2512497 | 3/1983 | France | |
| 2540180 | 8/1984 | France | |
| 88/08486 | 11/1988 | PCT Int'l Appl. | 60/602 |
| 88/09432 | 12/1988 | PCT Int'l Appl. | 60/602 |
| 2105878 | 3/1983 | United Kingdom | 60/600 |
| 2148391 | 5/1985 | United Kingdom | |

Primary Examiner—Michael Koczo
Attorney, Agent, or Firm—Jenner & Block

[57] ABSTRACT

An engine control system generates a manifold pressure demand signal from an engine output demand signal provided by an accelerator pedal position transducer or a cruise control. The manifold pressure demand signal is compared with the actual inlet manifold pressure and the difference used to control an engine throttle and a turbocharger by means of a waste gate.

19 Claims, 4 Drawing Sheets

TURBOCHARGED ENGINE CONTROL SYSTEM

The present invention relates to an engine control system. Such a control system may be used for controlling an internal combustion engine of the spark-ignition type.

An internal combustion engine generally has one or more inlet manifolds for the supply of a combustible mixture to the combustion spaces of the engine. The or each inlet manifold is arranged between the engine and an induction system which controls the supply of the combustible mixture. The induction system may comprise one or more carburetors or a fuel injection system, and generally includes one or more throttles, each of which is normally formed by a butterfly valve. Traditionally, the or each butterfly valve was controlled by a mechanical linkage from an accelerator pedal or cruise control in a vehicle. However, it has become more common for the or each throttle to be driven by an actuator, such as an electric motor, which receives control signals from a control unit. The control unit in turn receives engine output demand signals from a sensor actuated by an accelerator pedal or from a cruise control switch. There is therefore no mechanical linkage between driver-actuated controls and the or each throttle. Such systems are generally called "drive-by-wire" systems.

It has also become more common to employ pressurized induction systems in order to improve the power output and/or efficiency of internal combustion engines. Pressurized induction systems include an air compressor which forces air through the induction system and the or each manifold into the combustion spaces of the engine so as to increase the charge of combustible mixture supplied to each combustion space as compared with a "normally aspirated" induction system. There are two main types of pressurized induction system depending on the source of energy for driving the air compressor. So-called "superchargers" are mechanically driven by an output shaft of the engine so that the compressor speed, and hence output air pressure, is more or less directly related to engine speed. Such superchargers therefore absorb some of the power produced by the engine and are used simply to increase engine power without improving engine efficiency. So-called "turbochargers" include a turbine driven by exhaust gases from the engine, the turbine being mechanically coupled to the compressor. Some of the energy contained in the flow of exhaust gases from the engine is therefore recovered in order to drive the compressor and this allows an increase in engine output power and/or efficiency since the energy for driving the turbocharger is recovered from the exhaust gases with little or no absorption of power from the engine. In order to control the "boost pressure" produced by the air compressor, it is common to employ a "waste-gate" i.e. a valve which is controllable to allow some or all of the exhaust gases to by-pass the turbine. Waste-gates are generally used to limit the maximum flow of exhaust gases to the turbine and hence limit the maximum boost pressure.

According to a first aspect of the invention, there is provided a control system for controlling an internal combustion engine having an inlet manifold and an induction system, comprising signal generating means responsive to an engine output demand signal for generating a manifold pressure demand signal representing a demanded inlet manifold pressure, and control means responsive to the manifold pressure demand signal for controlling the induction system so as to reduce the difference between the demanded inlet manifold pressure and actual inlet manifold pressure.

The signal generating means may comprise a look-up table of base values of the manifold pressure demand signal addressed by the engine output demand signal. The look-up table may be addressed by at least one additional signal representing an engine operating parameter, such as engine speed.

The control means may include means for multiplying the demanded inlet manifold pressure by a correction factor representing air density, for instance in the form of a look-up table addressed by air temperature and engine speed.

The control means may include means responsive to engine temperature for limiting the demanded inlet manifold pressure when the engine temperature is outside a predetermined normal working range.

Preferably the system includes means for detecting engine knock and means for reducing the demanded inlet manifold pressure in response to detected knock. The detecting means may also be arranged to control means for retarding engine ignition timing in response to the detection of engine knock. The reducing means may comprise a look-up table addressed by the engine output demand signal and, preferably, by at least one engine operating parameter such as engine speed. The look-up table is preferably embodied as a non-volatile memory and there are preferably provided means for up-dating the values stored in the memory so as to adapt the correction in the case of engine knock to prevailing conditions and allow for drifting of various parameters.

Preferably the control means is arranged to control the position of an engine throttle. The control means may comprise a look-up table addressed by the manifold pressure demand signal, and preferably by at least one engine operating parameter such as engine speed.

For a pressurized induction system, the control means is preferably arranged to control air compression so as to reduce the difference between the demanded inlet manifold pressure and the actual inlet manifold pressure. In the case of a turbocharger, the control means is preferably arranged to control a waste gate for diverting exhaust gas from a turbine of the turbocharger. Preferably, the control means provides open loop control of an engine throttle and closed loop control of air compression (boost pressure). For instance, the manifold pressure demand signal may be compared with a signal representing measured inlet manifold pressure and the difference between these signals used to control a waste gate.

According to a second aspect of the invention, there is provided a method of controlling an internal combustion engine having an inlet manifold and an induction system, comprising generating a manifold pressure demand signal representing a demanded inlet manifold pressure from an engine output demand signal, and controlling the induction system in response to the manifold pressure demand signal so as to reduce the difference between the demanded inlet manifold pressure and actual inlet manifold pressure.

It is thus possible to provide a control system which controls an internal combustion engine on the basis of inlet manifold pressure. This has various advantages over previously known drive-by-wire systems, including the ability to provide improved control of a forced induction arrangement using a turbocharger. For instance, it is possible to maintain a predetermined level of boost pressure upstream of a partly open throttle in the induction system. By suitable calibration of, for instance, a throttle position table contained in a look-up memory for controlling throttle position, the boost pressure can be controlled at different operating conditions to give improved response to sudden opening of the throttle. The phenomenon known as "turbo lag" which causes a lag in engine response to increased throttle opening can therefore be substantially reduced. The response and economy of the engine can be balanced by adopting suitable strategies and two or more different strategies may be provided, for instance by two or more sets of look-up table values for throttle position control, to allow different driving modes to be selected by a driver. For instance, by selecting different tables and hence different control strategies, it is possible to select a "performance" mode for providing maximum power and torque, an "economy" mode which minimizes the consumption of fuel, and one or more intermediate or "normal" modes which represent different compromises between maximum performance and maximum fuel economy. Such controls may be linked to automatic operation of a transmission so as to control the selection of different gear ratios. For instance, the performance mode could cause a gearbox to hold lower ratios to higher speeds whereas the economy mode could cause the gearbox to select higher ratios at lower speeds.

For a pressurized induction system, the control means is preferably arranged to control the position of an engine throttle so as to reduce the difference between the demanded inlet manifold pressure and the actual inlet manifold pressure. Preferably, the control means provides closed loop control of the engine throttle and open loop control of air compression (boost pressure). For instance, the manifold pressure demand signal may be compared with a signal representing measured inlet manifold pressure and the difference between these signals used to control throttle position.

Preferably the control means includes a throttle position controller for providing a demanded throttle position signal from the difference between the manifold pressure demand signal and the signal representing measured inlet manifold pressure, means for generating a target throttle position signal from the manifold pressure demand signal, and means for controlling air compression so as to reduce the difference between the demanded throttle position signal and the target throttle position signal.

The air compression controlling means may, in the case of a turbocharged system, be arranged to control a waste gate for diverting exhaust gas from a turbine of the turbocharger. The means for generating the target throttle position signal may comprise a look-up table addressed by the manifold pressure demand signal, and preferably by at least one engine operating parameter such as engine speed.

It is thus possible to provide a system in which manifold pressure is controlled by controlling throttle position. This provides a faster and smoother control of engine output than a system which uses boost pressure to control manifold pressure. Instead, boost pressure is controlled so that the demanded throttle position returns to its target value following a change in engine output demand.

A further advantage is that manifold pressure is correctly controlled irrespective of altitude and particularly irrespective of the altitude at which the target throttle positions in the look-up table were determined.

The invention will be further described by way of example, with reference to the accompanying drawings, in which.

Figure 1:
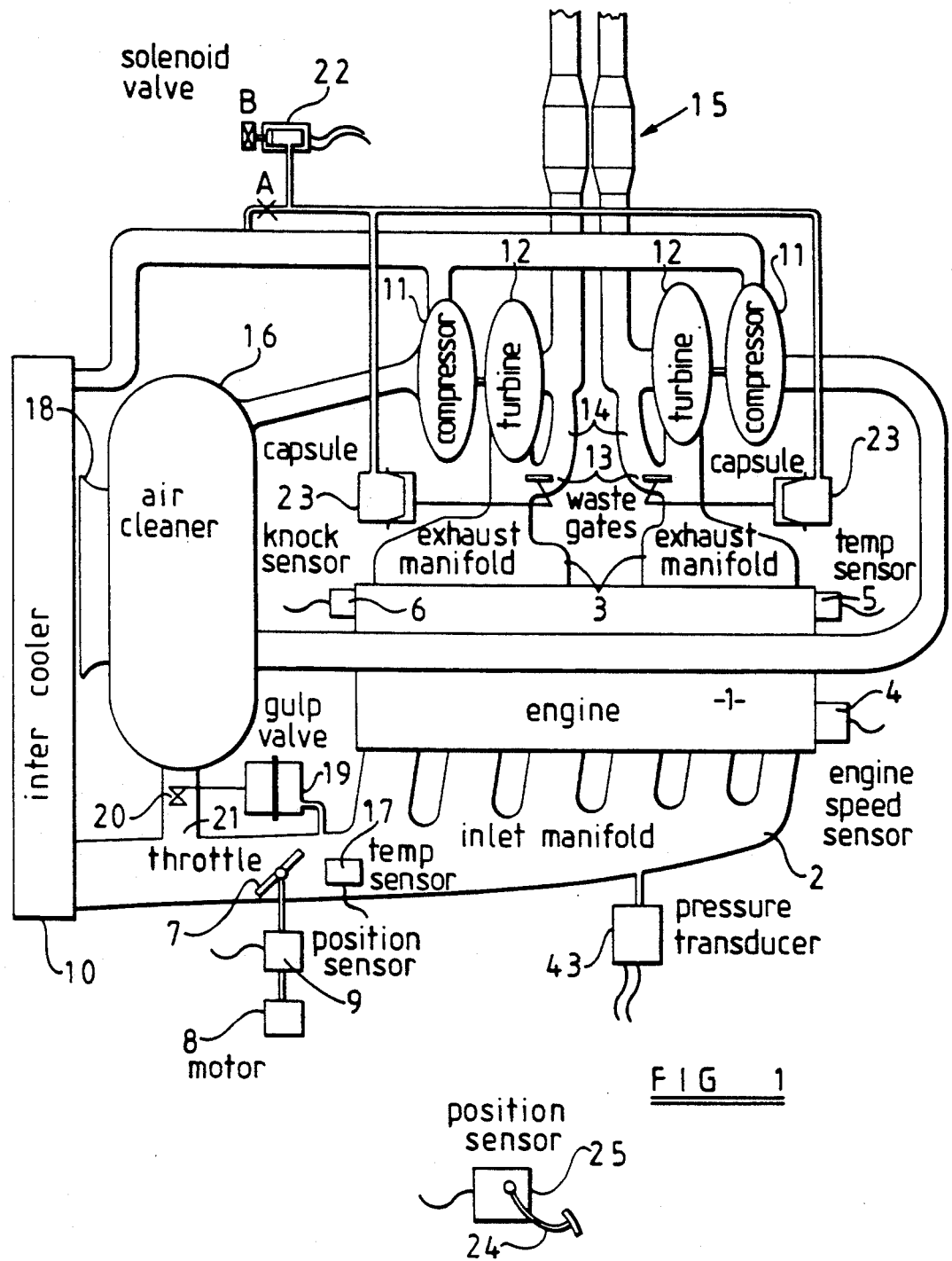
FIG. 1 is a diagram illustrating the layout of an engine and induction system.

FIG. 1 shows a six cylinder in-line engine 1 provided with an inlet manifold 2 and exhaust manifold 3. The engine is further provided with an engine speed sensor 4, an engine temperature sensor 5, and a knock sensor 6 (or several knock sensors e.g. one for each cylinder).

An induction system is located upstream of the inlet manifold 2 and includes a throttle 7 in the form of a butterfly valve controlled by an electric motor 8. A throttle position sensor 9 supplies a signal corresponding to the position of the throttle. The fuel injection means (not shown) are located downstream of the throttle 7 and an intercooler 10 is provided in the form of a heat exchanger which reduces the temperature of compressed air so as to increase its density. A temperature sensor 17 is located downstream of the throttle 7 and measures the temperature of air supplied to the inlet manifold 2.

The intercooler 10 has an inlet connected to compressors 11 whose impellers are mechanically connected to the rotors of turbines 12. The compressors 11 and turbines 12 comprise turbochargers with the turbines 12 being driven by exhaust gas from the exhaust manifolds 3. Waste gates 13 control the flow of exhaust gases through bypass channels 14 which bypass the turbines 12, so as to control the speed of the turbines 12 and hence the boost pressure provided by the compressors 11. The exhaust gases from the turbines 12 and/or via the waste gates 13 and bypasses 14 flow away through an exhaust system indicated generally at 15.

The inlets of the compressors 11 are connected to a plenum chamber 16 which contains an air cleaning filter for removing particles from the air. The plenum chamber 16 has an inlet 18 for receiving air from the atmosphere.

A pressure-operated diaphragm 19 is connected to the inlet manifold downstream of the throttle 7 for controlling movement of the diaphragm. The diaphragm is in turn connected to a valve 20 located in a passage 21 for selectively permitting air to flow from the induction system to the plenum chamber 16 so as to vent compressed air to the atmosphere via the inlet 18 during operation at relatively high boost pressures when the throttle 7 is closed quickly.

A solenoid valve 22 having a variable restriction B is connected to receive pressurized air from the compressors 11 via a fixed restriction A and controls the supply of pressurized air to pressure-operated capsules 23 by acting as a controllable pressure divider. The capsules 23 in turn control the angle of opening of the waste gates 13. The solenoid valve 22 is energized by a pulse width modulated signal so as to control the pressure supplied to the capsules 23 and thus control the angles of opening of the waste gates 13.

An accelerator pedal 24 operated by the foot of a vehicle driver is connected to a position sensor 25 so as to supply a driver demand signal for controlling the engine 1. If a cruise control is present, the driver demand signal may be selectively supplied from the cruise control. The driver demand signal may also be modulated, for instance to allow traction or wheel spin control to be performed.

Figure 2:
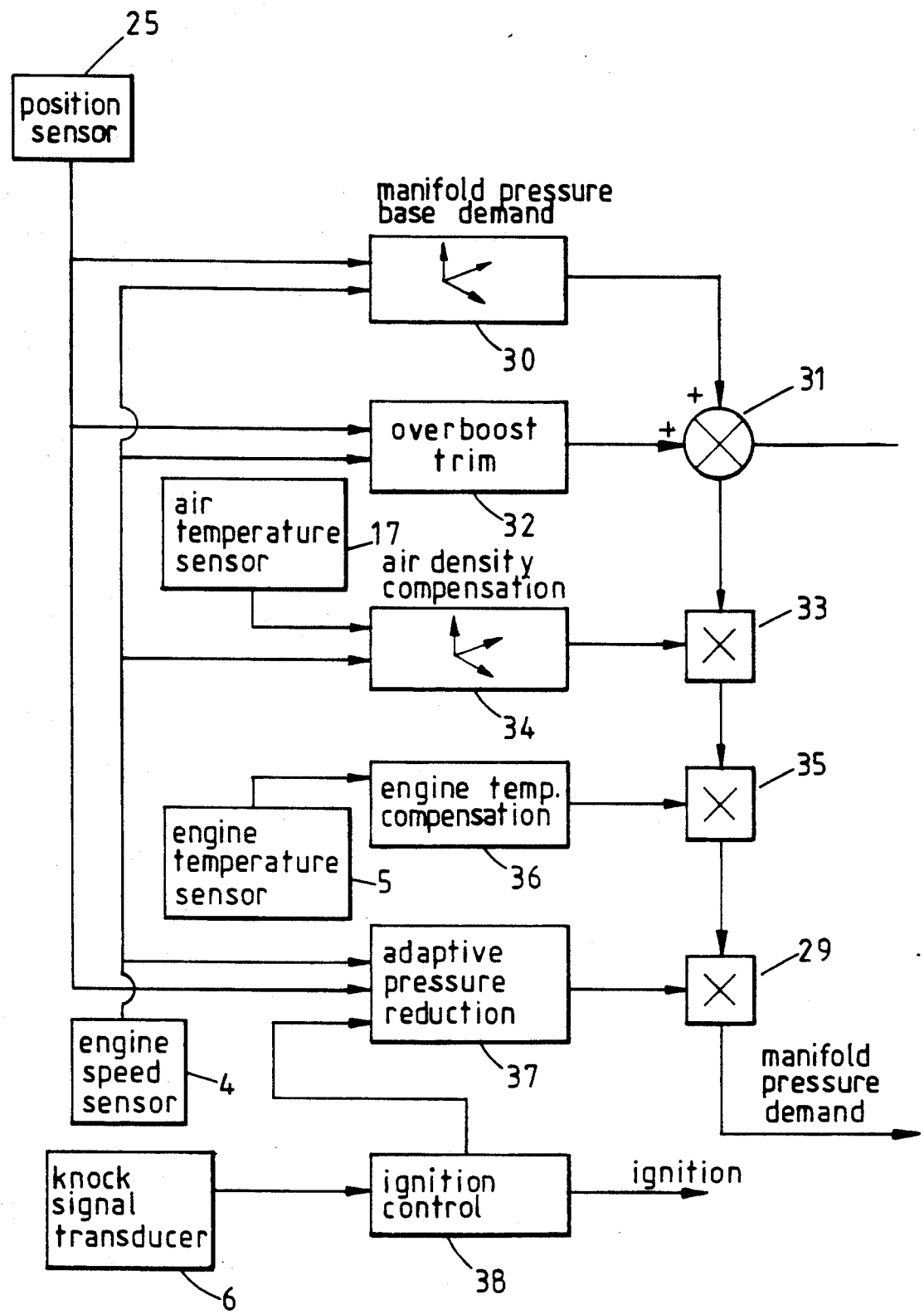
FIGS. 2 and 3 are block schematic diagrams of an engine control system constituting a first embodiment of the present invention.
Figure 3:
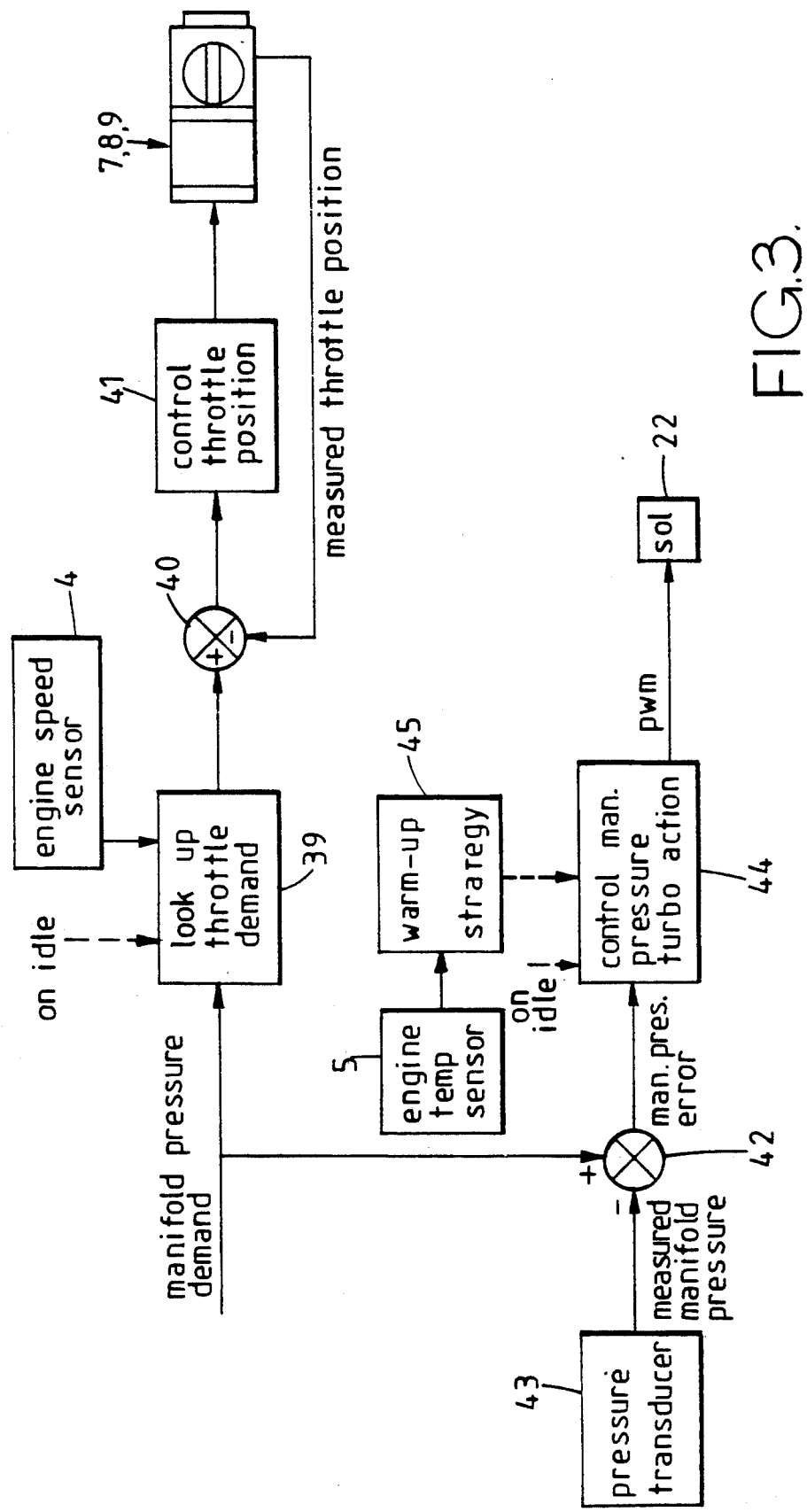

The control system shown in FIGS. 2 and 3 comprises a plurality of look-up tables in the form of read only memories containing two dimensional maps of parameters which are addressed by various different signals. The density of the parameters in the two dimensional address plane is sufficient to enable accurate output values to be obtained. If necessary or desirable, interpolation may be used in order to achieve more accurate parameter values at points which are displaced from the addressed points of the maps.

The control system comprises a manifold pressure base demand look-up table 30 which is addressed by a driver demand signal from the position sensor 25 (or other source) and an engine speed signal from the engine speed sensor 4. The output of the table 30 is a base manifold pressure signal and is supplied to a first input of an adder 31. A second input of the adder 31 is connected to the output of a look-up table 32 which is also addressed by the driver demand and engine speed signals. The look-up table 32 contains a map of overboost trim values to allow for predetermined levels of overboost after certain transient operations subject to turbocharger and engine constraints.

The output of the adder 31 is supplied to a first input of a multiplier 33. A second input of the multiplier 33 is connected to the output of a look-up table 34 which is addressed by the engine speed signal and by a signal from the air temperature sensor 17. The table 34 contains values representing a correction factor for the density of air corresponding to the various air temperatures and engine speeds.

The output of the multiplier 33 is connected to a first input of a multiplier 35. A second input of the multiplier 35 is connected to the output of an engine temperature compensation circuit 36 which receives an engine temperature signal from the sensor 5 and provides a correction factor to protect against excessive power being demanded at high or low engine temperatures so as to avoid the possibility of damage to the engine.

The output of the multiplier 35 is connected to a first input of a multiplier 29. A second input of the multiplier 29 is connected to the output of an adaptive pressure reduction circuit 37 for preventing knock. The output signal of the knock transducer 6 is connected to an input of an ignition control circuit 38 which supplies an output for controlling ignition timing of the engine, particularly spark advance in a spark-ignition internal combustion engine. The signal from the sensor 6 is processed in the control unit 38 in order to detect the occurrence of knock and, upon detection, the ignition timing is retarded. However, at certain engine operating points, it is not possible to control or eliminate knock merely by retarding the ignition timing. In particular, retarding ignition timing beyond a certain point under such conditions could cause an excessive rise in turbocharger inlet temperature with the possibility of damage to the turbocharger. It is therefore necessary to reduce inlet manifold pressure in order to reach a knock-free operating condition.

Thus, once the total or individual cylinder ignition timing has been retarded by the control unit 38 as far as is permissible for that operating condition as defined by manifold pressure and engine speed, the control unit 38 supplies a signal to the adaptive pressure reduction circuit 37 so as to activate the circuit 37. The circuit 37 contains a look-up table of manifold pressure reduction factors addressed by engine speed and driver demand signals so as to reduce the manifold pressure demand to a value which will eliminate knock. The look-up table is stored in a non-volatile read/write memory which is up-dated in accordance with operation of the engine so as to ensure that the reduction factors corresponding to different engine speeds and driver demands are adapted to the requirements of the engine, induction system, and control system in order to eliminate knock. For instance, each time a particular factor is addressed, this factor is used by the multiplier 29 to reduce the manifold pressure demand signal. If knock is eliminated, the value of the factor is incremented for subsequent use. However, if use of that factor does not prevent knock, then the value is decremented for subsequent use. The look-up table therefore contains values which are always just sufficient to eliminate knock immediately upon its detection.

The manifold pressure demand signal is supplied to a throttle position controller including a throttle demand look-up table 39. The look-up table 39 is addressed by the manifold pressure demand signal and the engine speed signal and supplies throttle position demand signals to the positive input of a subtracter 40. The table 39 also receives an "on idle" signal when the accelerator pedal position transducer 25 supplies a signal corresponding to the accelerator pedal being at or adjacent its uppermost position. When this condition is detected, the table 39 supplies a throttle position demand signal corresponding to idle operation of the engine.

The negative input of the subtracter 40 receives a measured throttle position signal from the throttle position sensor 9 and supplies an error signal to a throttle position controller 41, for instance comprising a proportional/integral/differential (PID) controller. The output of the controller 41 drives the throttle motor 8 so as to reduce the error signal. The position of the throttle is thus controlled by a servo feedback loop which sets the throttle to the demanded position from the table 39.

The manifold pressure demand signal is supplied to the positive input of a subtracter 42 whose negative input receives the measured manifold pressure from the pressure transducer 43. The output of the subtracter 42 supplies a manifold pressure error signal to a control unit 44. During normal operation, the control unit 44 converts the error signal into a pulse width modulated signal which is supplied to the solenoid 22 for controlling the waste gates 13, and hence the boost pressure provided by the turbochargers. The control unit 44 is arranged to have, for instance, a PID function and controls the turbocharger boost pressure so as to reduce the manifold pressure error signal.

During idle operation of the engine, the control unit 44 responds to the "on idle" signal from the accelerator position sensor 25 and supplies a constant pulse width modulated signal to the solenoid 22 so as to set the waste gates 13 to predetermined nominally fixed positions for idle operation. Also, during the warm-up phase of engine operation, the control unit 44 operates in accordance with a warm-up strategy supplied by a circuit 45 in response to an engine temperature signal from the sensor 5.

During normal operation of the control system, a driver demand signal controls operation of the engine by forming a manifold pressure demand signal. The throttle is under open loop control with respect to manifold pressure and the boost pressure is controlled by closed loop operation so as to achieve the demanded manifold pressure in the inlet manifold 2 of the engine 1. The system therefore compensates automatically for, for instance, changes in altitude by adjusting the turbocharger boost pressure to maintain the demanded inlet manifold pressure.

A certain level of boost can be maintained upstream of a partly open throttle. By suitably calibrating the throttle demand table 39, the boost can be adjusted at different operating conditions to give an improved response upon sudden opening of the throttle, thus reducing the problem of turbo-lag. By making different responsiveness/economy trade offs selectively available, the engine can be operated in different modes and these modes can be controlled simultaneously with different automatic transmission modes, for instance to provide maximum performance, maximum economy or an intermediate setting which represents a compromise between these extremes.

Further, engine knock can be eliminated by controlling both ignition and boost pressure. This avoids excessive inlet temperatures which might damage the turbochargers if the ignition timing were retarded excessively while avoiding an undesirable loss of output if knock were controlled solely by reducing boost pressure.

Various modifications may be made within the scope of the invention. For instance, the control system may be used with a normally aspirated engine by merely controlling throttle position in open loop or closed loop mode. In such an arrangement, the throttle position is controlled so as to achieve the demanded manifold pressure and knock can be eliminated by a combination of retarding the ignition timing and reducing the manifold pressure.

Figure 4:
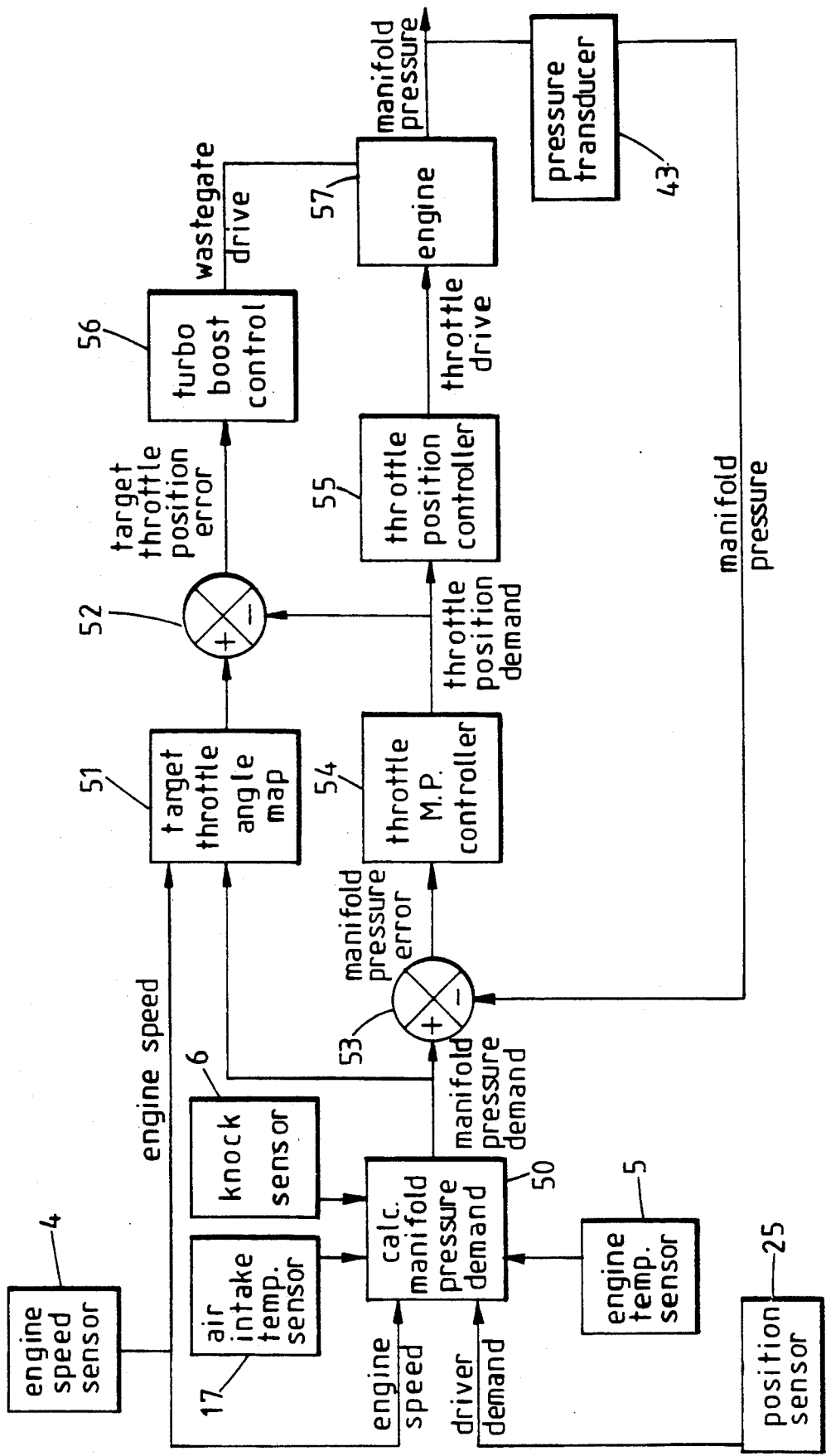
FIG. 4 is a block schematic diagram of an engine control system constituting a second embodiment of the present invention.

FIG. 4 shows another control system in which a circuit 50 generates a manifold pressure demand signal from signals received from suitable sensors, for instance as shown in FIG. 1. The signals from these sensors represent information relating to engine knock, air intake temperature, engine speed, driver demand, and engine temperature. The circuit 50 may, for instance, comprise the elements 29 to 38 shown in FIG. 2.

The manifold pressure demand signal is supplied to a waste gate position controller including a target throttle angle map or look-up table 51. The look-up table 51 is addressed by the manifold pressure demand signal and the engine speed signal and supplies target throttle angle signals to the positive input of a subtracter 52.

The manifold pressure demand signal is also supplied to the positive input of a subtracter 53 whose negative input receives a signal representing actual manifold pressure from the manifold pressure sensor 43. The output of the subtracter 53 represents manifold pressure error and is supplied to a throttle manifold pressure controller 54, for instance formed by a proportional/integral/differential (PID) controller. The output of the controller 54 provides a throttle position demand signal to a throttle position controller 55, for instance comprising a servo control loop of the type illustrated by the elements 7-9, 40, 41 in FIG. 3.

The negative input of the subtracter 52 receives the throttle position demand signal from the throttle controller 54 and supplies a target throttle position error signal to a turbo boost controller 56, for instance of the type comprising element 44 for supplying a waste gate drive signal for controlling one or more turbocharger waste gates.

The output signal of the controller 54 can take values which represent throttle positions outside the throttle position range, and can even be allowed to saturate, because the action of the subtracter 52 and the turbo boost controller 56 adjusts the boost pressure so that the throttle achieves the target angle from the table 51. The demanded manifold pressure is thus achieved primarily by throttle control and the target throttle angle is achieved by boost pressure control.

During normal operation of the control system, a driver demand signal controls operation of the engine 57 by forming the manifold pressure demand signal. The throttle is under closed loop control with respect to manifold pressure and the boost pressure is controlled by open loop operation so as to achieve the demanded manifold pressure in the inlet manifold of the engine 57. The system therefore compensates automatically for, for instance, changes in altitude by adjusting the throttle angle to maintain the demanded inlet manifold pressure and the turbocharger boost pressure to maintain the target throttle angle.

By suitably calibrating the target throttle angle table 51, the boost can be adjusted at different operating conditions to give an improved response upon sudden opening of the throttle, thus reducing the problem of turbo-lag. In particular, during such transient conditions, relatively rapid control of the throttle angle compensates for lag in turbocharger response i.e. temporary lack or excess of boost. Thus, manifold pressure is controlled by the faster and more refined throttle control, resulting in fast and smooth engine control. Also manifold pressure is properly controlled irrespective of the altitude for which the target throttle angles were mapped.

By making different responsiveness/economy trade offs selectively available, the engine can be operated in different modes and these modes can be controlled simultaneously with different automatic transmission modes, for instance to provide maximum performance, maximum economy or an intermediate setting which represents a compromise between these extremes.

We claim:

1. A control system for controlling a spark-ignition internal combustion engine having an inlet manifold and an induction system for controlling a supply of a combustible mixture to the engine, the induction system including an engine throttle, said control system comprising signal generating means responsive to an engine output demand signal for generating a manifold pressure demand signal representing a demanded inlet manifold pressure, and control means responsive to the manifold pressure demand signal for controlling the engine throttle of the induction system so as to reduce a difference between the demanded inlet manifold pressure and an actual inlet manifold pressure, said control means including positioning means for controlling a position of the engine throttle and compression control means for controlling air compression so as to reduce the difference between the demanded inlet manifold pressure and the actual inlet manifold pressure, said positioning means including a throttle angle look-up table addressed by the manifold pressure demand signal.

2. A system as claimed in claim 1, in which said signal generating means comprises a look-up table addressed by the engine output demand signal.

3. A system as claimed in claim 2, in which said look-up table is addressed by at least one additional signal representing an engine operating parameter.

4. A system as claimed in claim 1, in which said control means includes multiplying means for multiplying the manifold pressure demand signal by a correction factor representing air density.

5. A system as claimed in claim 1, in which said control means includes limiting means responsive to a temperature of the engine for limiting the manifold pressure demand signal when the temperature of the engine is outside a predetermined normal working range.

6. A system as claimed in claim 1, further comprising detecting means for detecting engine knock and reducing means responsive to said detecting means for reducing the manifold pressure demand signal.

7. A system as claimed in claim 6, in which said detecting means includes retarding means responsive to detection of engine knock for retarding an engine ignition timing.

8. A system as claimed in claim 6, in which said reducing means includes a reduction look-up table addressed by the engine output demand signal.

9. A system as claimed in claim 8, in which said reduction look-up table is a non-volatile memory arranged to be updated in accordance with a threshold of engine knock.

10. A system as claimed in claim 1, in which said throttle angle look-up table is addressed by at least one further signal representing an engine operating parameter.

11. A system as claimed in claim 1, in which said compression control means includes waste gate control means for controlling a waste gate for diverting exhaust gas from a turbine of a turbocharger.

12. A system as claimed in claim 1, in which said control means comprises open loop throttle control means for providing open loop generation of an engine throttle position demand signal and closed loop control means for providing closed loop control of air compression.

13. A system as claimed in claim 12, in which said closed loop control means includes differencing means for forming a difference between the manifold pressure demand signal and a signal representing the actual inlet manifold pressure, and means for controlling air compression in response to the difference.

14. A control system for controlling a spark-ignition internal combustion engine having an inlet manifold and are pressurized induction system for controlling a supply of a combustible mixture to the engine, the induction system including an engine throttle, said control system comprising signal generating means responsive to an engine output demand signal for generating a manifold pressure demand signal representing a demanded inlet manifold pressure, and control means responsive to the manifold pressure demand signal for controlling the engine throttle of the induction system so as to reduce a difference between the demanded inlet manifold pressure and an actual inlet manifold pressure, said control means including throttle control means for controlling a position of an engine throttle so as to reduce the difference between the demanded inlet manifold pressure and the actual inlet manifold pressure, said throttle control means comprising closed loop throttle control means for providing closed loop control of the engine throttle and open loop compression control means for providing open loop control of air compression based on demanded inlet manifold pressure.

15. A system as claimed in claim 14, in which said closed loop throttle control means comprises subtracting means for forming a difference between the manifold pressure demand signal and a signal representing the actual inlet manifold pressure, and throttle position control means responsive to the difference for controlling the position of the engine throttle.

16. A system as claimed in claim 15, in which said throttle control means comprises a manifold pressure controller responsive to the difference for providing a demanded throttle position signal, said open loop compression control means comprising target position generating means for generating a target throttle position signal from the manifold pressure demand signal, and air compression controlling means for controlling air compression so as to reduce the difference between the demanded throttle position signal and the target throttle position signal.

17. A system as claimed in claim 16, in which the target position generating means comprises a target position look-up table addressed by the manifold pressure demand signal.

18. A system as claimed in claim 17, in which the target position look-up table is addressed by at least one other signal representing an engine operating parameter.

19. A system as claimed in claim 14, in which the control means includes means for controlling a waste gate for diverting exhaust gas from a turbine of a turbocharger.

* * * * *